(12) United States Patent
Zhu et al.

(10) Patent No.: US 12,469,839 B2
(45) Date of Patent: Nov. 11, 2025

(54) RIBBON CARRIER ASSEMBLY, WELDING DEVICE, AND WELDING METHOD

(71) Applicant: ZHEJIANG QIUSHI SEMICONDUCTOR EQUIPMENT CO., LTD., Zhejiang (CN)

(72) Inventors: Liang Zhu, Zhejiang (CN); Jiabin Lu, Zhejiang (CN); Honggang Gao, Zhejiang (CN); Jianwei Cao, Zhejiang (CN); Linjian Fu, Zhejiang (CN); Zhicong Chen, Zhejiang (CN); Jianguang Zhang, Zhejiang (CN); Chao Yang, Zhejiang (CN)

(73) Assignee: ZHEJIANG QIUSHI SEMICONDUCTOR EQUIPMENT CO., LTD., Hangzhou (CN)

( * ) Notice: Subject to any disclaimer, the term of this patent is extended or adjusted under 35 U.S.C. 154(b) by 0 days.

(21) Appl. No.: 18/257,892

(22) PCT Filed: Mar. 3, 2023

(86) PCT No.: PCT/CN2023/079691
§ 371 (c)(1),
(2) Date: Jun. 16, 2023

(87) PCT Pub. No.: WO2024/119635
PCT Pub. Date: Jun. 13, 2024

(65) Prior Publication Data
US 2024/0047644 A1    Feb. 8, 2024

(51) Int. Cl.
*B23K 20/00* (2006.01)
*H01M 4/04* (2006.01)
*H01M 4/75* (2006.01)

(52) U.S. Cl.
CPC ......... *H01M 4/0471* (2013.01); *B23K 20/002* (2013.01); *H01M 4/75* (2013.01)

(58) Field of Classification Search
CPC ....... B21C 1/24; B21C 37/18; B23K 2101/06; B23K 20/00; B23K 20/1255;
(Continued)

(56) References Cited

U.S. PATENT DOCUMENTS 2,422,979 A * 6/1947 Pecker ................... B27D 1/083
493/379
2,439,716 A * 4/1948 Canfield ................. B32B 27/00
264/102
(Continued)

FOREIGN PATENT DOCUMENTS

CN    110391316 A    10/2019
CN    110620073 A    12/2019
(Continued)

OTHER PUBLICATIONS

ISR for International Application PCT/CN2023/079691 mailed Jul. 21, 2023.
(Continued)

*Primary Examiner* — Erin B Saad
(74) *Attorney, Agent, or Firm* — Ladas & Parry LLP

(57) ABSTRACT

A ribbon carrier assembly, a welding device, and a welding method for preprocessing between a battery sheet and a ribbon are disclosed. The carrier assembly includes a carrier seat; a carrier body, rotatably connected to the carrier seat; and a driving assembly, connected to the carrier body and configured to control the rotation of the carrier body. At least one operation surface is arranged on the carrier body and is arranged as a curved surface. Adsorption holes are arranged on the operation surface. The battery sheet is adsorbed and fixed to the operation surface by applying a negative pressure to the adsorption holes. Through tins, dry joints between the battery sheet and the ribbon can be reduced during welding of the ribbon and the battery sheet. The
(Continued)

battery sheet is bent on the curved surface to avoid warping or cracking of the battery sheet caused by excessive heating.

8 Claims, 6 Drawing Sheets

(58) Field of Classification Search
CPC .. B23K 20/126; B23K 20/1265; B23K 26/36; B23K 2101/34; B23K 2101/36; B23K 26/0624; B23K 1/00; B23K 1/18; B23K 2101/16; B23K 31/027; B23K 1/19; B23K 11/0093; B23K 20/04; B23K 26/211; B23K 26/244; B23K 26/26; B23K 26/32; B23K 26/362; B23K 35/0222; B23K 35/0227; B23K 35/0244; B23K 35/40; B23K 9/0035
See application file for complete search history.

(56) References Cited

U.S. PATENT DOCUMENTS

| | | | | |
|---|---|---|---|---|
| 2,453,537 A | * | 11/1948 | Phillips | B31C 11/04 57/31 |
| 2,575,631 A | * | 11/1951 | Link | H01G 13/02 269/21 |
| 3,327,513 A | * | 6/1967 | Hinshaw | B21C 37/18 72/274 |
| 2021/0075361 A1 | | 3/2021 | Akhavan-Tafti | |

FOREIGN PATENT DOCUMENTS

| | | |
|---|---|---|
| CN | 111185687 A | 5/2020 |
| CN | 212967725 U | 4/2021 |
| CN | 214753818 U | 11/2021 |
| CN | 115621171 A | 1/2023 |
| CN | 115635319 A | 1/2023 |
| JP | 6938802 B1 | 9/2021 |

OTHER PUBLICATIONS

Written Opinion for International Application PCT/CN2023/079691 mailed Jul. 21, 2023.

* cited by examiner

RIBBON CARRIER ASSEMBLY, WELDING DEVICE, AND WELDING METHOD

RELATED APPLICATION

This application is a U.S. National Stage Application under 35 U.S.C. § 371 of International Application No. PCT/CN2023/079691 which was filed on Mar. 3, 2023, which claims priority from Chinese Application No. 202210499017.0 filed May 9, 2022 the disclosures of which are incorporated in their entirety by reference herein.

TECHNICAL FIELD

The present invention relates to the field of photovoltaic technologies, and in particular, to a ribbon carrier assembly, a welding device, and a welding method.

BACKGROUND

The existing mainstream technology of arranging ribbons for battery sheets includes the following steps: pulling ribbons, cutting the ribbons, transferring the ribbons, arranging and placing the ribbons, and welding the ribbons. The problems existing in the process are as follows. First, the structure of the ribbon arrangement mechanism is complex, and the expansibility is poor, which cannot meet the increasing demand of a number of arranged multi-wire ribbons. Second, for the multi-grid battery sheet ribbon distribution, the existing ribbon distribution technology needs a corresponding number of ribbon supply barrels, which is not only difficult to replace the ribbon, but also occupies a large device space and has high costs.

In addition, during the welding of the ribbon, dry joints may exist between the ribbon and the battery sheet, which may affect the normal and practical use of the battery sheet. Second, in the process of ribbon welding, the battery sheet may be warped or cracked due to excessive heating, which may affect the service life of the battery sheet and even make the battery sheet unusable.

SUMMARY

In order to solve the shortcomings of the prior art, the present invention is intended to provide a ribbon carrier assembly, a welding device, and a welding method, so as to reduce dry joints and prolong the service life of a battery sheet.

In order to achieve the above objective, the present invention adopts the following technical solutions.

A ribbon carrier assembly is configured for preprocessing between a battery sheet and a ribbon. Further, the carrier assembly includes a carrier seat; a carrier body, rotatably connected to the carrier seat; and a driving assembly, connected to the carrier body and configured to control the rotation of the carrier body. At least one operation surface is arranged on the carrier body. The operation surface is arranged as a curved surface. Adsorption holes are arranged on the operation surface. The battery sheet is adsorbed and fixed to the operation surface by applying a negative pressure to the adsorption holes.

Further, the carrier body is plate-shaped, and the operation surface is arranged on each of front and back sides of the carrier body.

Further, the carrier body is columnar, several side surfaces are arranged on the carrier body, and the operation surface is arranged on each of the side surfaces.

Further, two adjacent operation surfaces are connected to each other.

Further, the adsorption holes are uniformly arranged on the operation surface.

Further, the carrier assembly includes a first state and a second state, and when the carrier assembly is in the first state, at least one operation surface is horizontally arranged; and when the carrier assembly is in the second state, the carrier assembly is in a rotating state, to switch between the operation surfaces.

In order to achieve the above objective, the present invention adopts the following technical solutions.

A welding device includes: a first mechanism, including a sheet attaching assembly, a heating assembly, a cutting assembly, and a sheet detaching assembly; and a second mechanism, including at least one carrier assembly, where the ribbon carrier assembly has a freedom of movement. The carrier assembly moves among the sheet attaching assembly, the heating assembly, the cutting assembly, and the sheet detaching assembly to form a first work station, a second work station, a third work station, and a fourth work station. When the carrier assembly is at the first work station, the sheet attaching assembly places the battery sheet on the operation surface, and the ribbon is wound around the battery sheet. When the carrier assembly is at the second work station, the heating assembly heats the battery sheet to weld the battery sheet to the ribbon. When the carrier assembly is at the third work station, the cutting assembly cuts the ribbon along an edge of the operation surface. When the carrier assembly is at the fourth work station, the sheet detaching assembly removes the battery sheet to which the ribbon is welded.

In order to achieve the above objective, the present invention adopts the following technical solutions.

A welding method, including:
placing the battery sheet on the operation surface through the sheet attaching assembly, and adsorbing and fixing the battery sheet to the operation surface through the adsorption holes, so that the battery sheet is deformed by pressure and attached to the operation surface arranged as a curved surface;
winding the ribbon around a surface of the battery sheet;
heating the battery sheet and/or the ribbon through the heating assembly to weld the battery sheet to the ribbon;
cutting the ribbon through the cutting assembly; and
removing, through the sheet detaching assembly, the battery sheet to which the ribbon is welded.

Further, an end of the ribbon is fixedly arranged on the surface of the battery sheet.

Further, the adsorption holes release the adsorption to the battery sheet after the ribbon is wound around the surface of the battery sheet, and the adsorption holes adsorb the battery sheet before the cutting assembly cuts the ribbon.

According to the ribbon carrier assembly, the welding device, and the welding method provided in the present invention, the operation surface may be arranged as a curved surface, so that the battery sheet is attached to the operation surface arranged as the curved surface, and then the battery sheet is bound by winding the ribbon, so that the shape of the battery sheet is preliminarily shaped, and free warping cannot occur. That is to say, the ribbon is wound and the operation surface is arranged as the curved surface, to jointly resist the deformation of the battery sheet, so that the battery sheet is prevented from being warped or cracked due to excessive heating during welding of the ribbon and the battery sheet, thereby prolonging the service life of the battery sheet.

DETAILED DESCRIPTION

In order to make a person in the field better understand the solution of the present invention, technical solutions in specific implementations of the present invention are clearly and completely described below with reference to the accompanying drawings of the implementations of the present invention.

Figure 1:
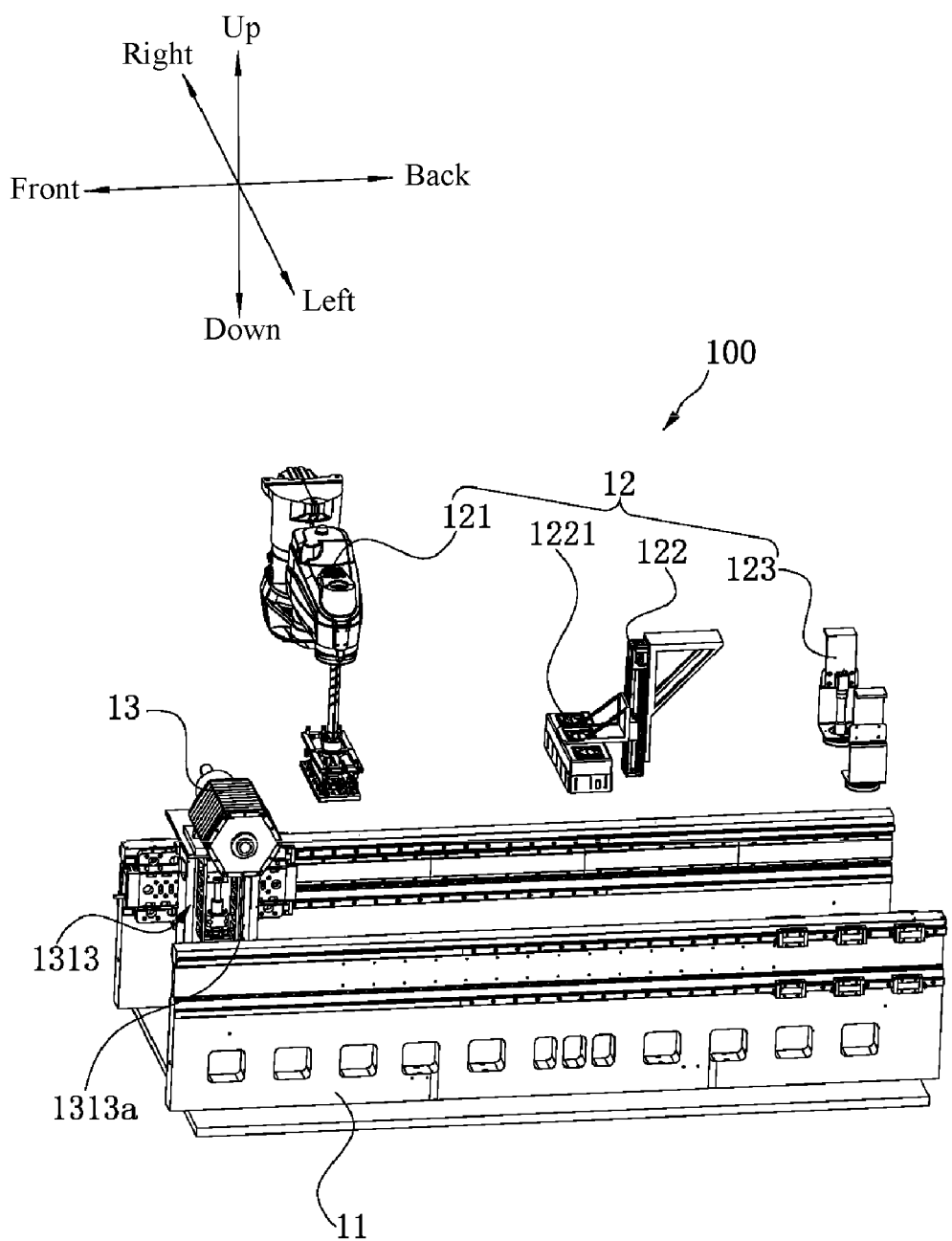
FIG. 1 is a schematic structural diagram of a welding device according to the present invention.
Figure 3:
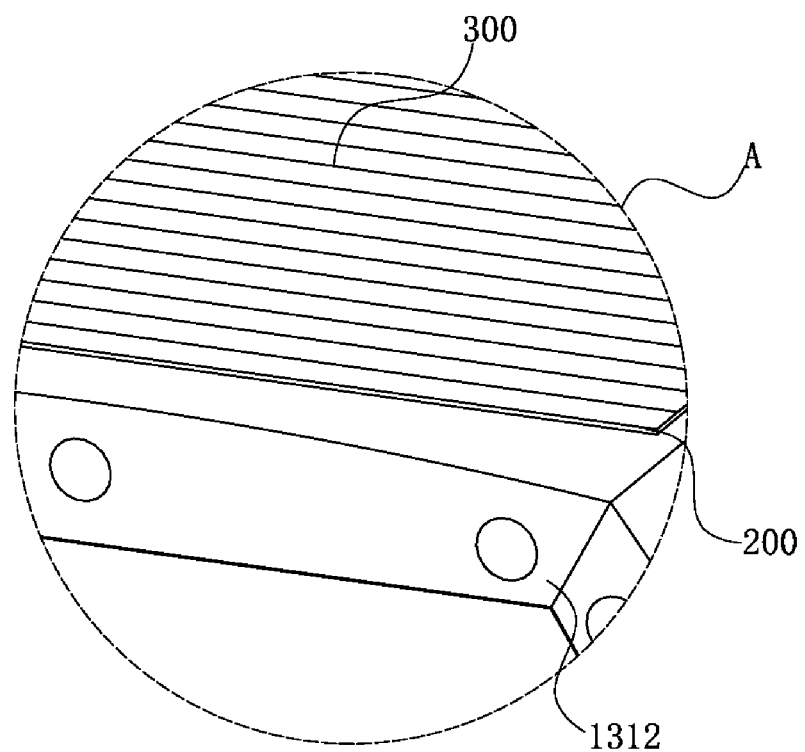
FIG. 3 is a partial enlarged view of a part A in FIG. 2 according to the present invention.

As shown in FIG. 1 and FIG. 3, a welding device 100 is configured for welding between a battery sheet 200 and a ribbon 300. The welding device 100 includes a device body 11, a first mechanism 12, and a second mechanism 13. The first mechanism 12 is at least partially arranged on the device body 11, and the first mechanism 12 is configured for attaching of the battery sheet 200, welding of the ribbon 300, cutting of the ribbon 300, and detaching of the battery sheet 200. The second mechanism 13 is configured for carrying the ribbon 300, and the first mechanism 12 sequentially completes the attaching of the battery sheet 200, the welding of the ribbon 300, the cutting of the ribbon 300, and the detaching of the battery sheet 200. In order to clearly describe the technical solution of the present invention, a front side, a rear side, a left side, a right side, an upper side, and a lower side as shown in FIG. 1 are further defined to indicate a front side, a rear side, a left side, a right side, an upper side, and a lower side of the welding device 100.

Specifically, the first mechanism 12 includes a sheet attaching assembly 121, a heating assembly 122, a cutting assembly 123, and a sheet detaching assembly (not shown). The sheet attaching assembly 121, the heating assembly 122, the cutting assembly 123, and the sheet detaching assembly are arranged in sequence from front to back. The sheet attaching assembly 121 is configured to place the battery sheet 200 on the second mechanism 13. The heating assembly 122 is configured to heat the battery sheet 200 to weld the ribbon 300 to the battery sheet 200. The cutting assembly 123 is configured to cut the ribbon 300. The sheet detaching assembly is configured to remove the battery sheet 200 from the second mechanism 13. Through the above arrangement, a sheet attaching region, a heating region, a cutting region, and a sheet detaching region are formed at the corresponding positions of the sheet attaching assembly 121, the heating assembly 122, the cutting assembly 123, and the sheet detaching assembly. In an embodiment, the sheet attaching assembly 121, the heating assembly 122, the cutting assembly 123, and the sheet detaching assembly are all located above the second mechanism 13, so as to facilitate corresponding operations on the second mechanism 13. It may be understood that the arrangement of the sheet attaching assembly 121, the heating assembly 122, the cutting assembly 123, and the sheet detaching assembly can be adjusted according to the change of the welding process of the battery sheet 200 and the ribbon 300, as long as the sheet attaching region, the heating region, the cutting region, and the sheet detaching region are formed at different positions.

Figure 2:
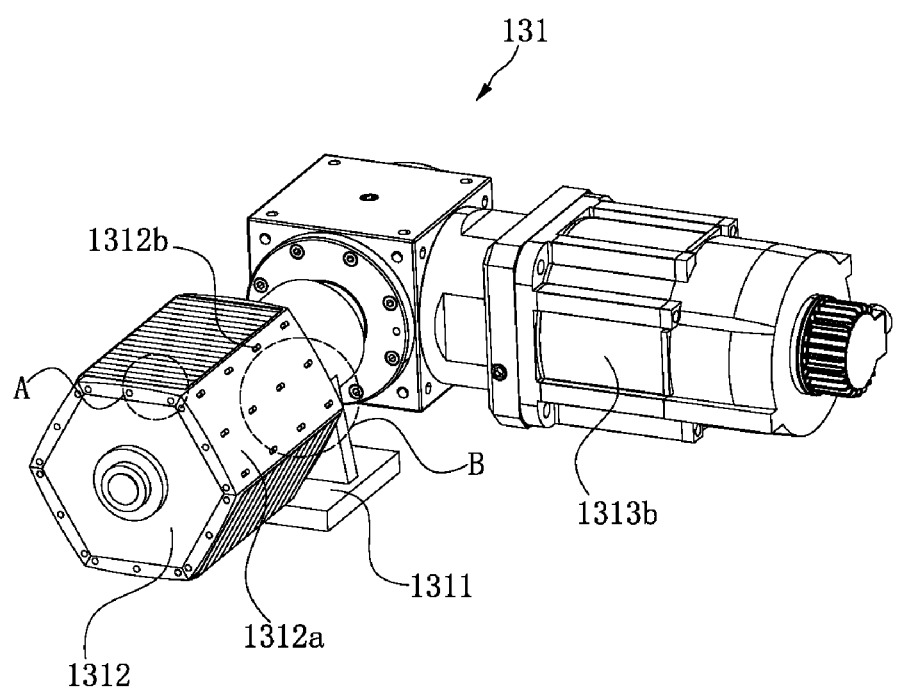
FIG. 2 is a schematic structural diagram of a carrier assembly according to the present invention.

As shown in FIG. 2 and FIG. 3, the second mechanism 13 includes at least one carrier assembly 131. The carrier assembly 131 is configured to carry the battery sheet 200 and the ribbon 300. After the battery sheet 200 is placed on the carrier assembly 131, the ribbon 300 may be laid on a surface of the battery sheet 200. The carrier assembly 131 has a freedom of movement, so that the carrier assembly 131 can move among the sheet attaching assembly 121, the heating assembly 122, the cutting assembly 123, and the sheet detaching assembly to form a first work station, a second work station, a third work station, and a fourth work station. The freedom of movement of the carrier assembly 131 means that the carrier assembly 131 can move in a front-back direction, an up-down direction, and/or a left-right direction of the welding device 100. More specifically, the carrier assembly 131 can move at least in the front-back direction of the welding device 100, so that the carrier assembly 131 can move between the first work station, the second work station, the third work station, and the fourth work station.

It may be understood that the second mechanism 13 may also include a plurality of carrier assemblies 131, so that the working efficiency of the welding device 100 can be improved. In this case, the carrier assembly 131 can move in the front-back direction of the welding device 100, and can further move in at least one of the up-down direction and the left-right direction of the welding device 100, so as to prevent interference among several carrier assemblies 131 and avoid affecting the normal operation of the welding device 100.

In this implementation, when the carrier assembly 131 is at the first work station, the sheet attaching assembly 121 places the battery sheet 200 on the carrier assembly 131, and the ribbon 300 is wound around the battery sheet 200. When the carrier assembly 131 is at the second work station, the heating assembly 122 heats the battery sheet 200 to weld the battery sheet 200 to the ribbon 300. When the carrier assembly 131 is at the third work station, the cutting assembly 123 cuts the ribbon 300. When the carrier assembly 131 is at the fourth work station, the sheet detaching assembly removes the battery sheet 200 to which the ribbon 300 is welded. Through the above arrangement, the process operation of the battery sheet 200 and the ribbon 300 is performed at different work stations, and the welding of the battery sheet 200 and the multi-wire ribbon 300 is realized.

In an embodiment, the sheet attaching assembly 121 adopts the form of a first manipulator to attach the battery sheet 200. Further, an end of the first manipulator is provided with an adsorption portion, and the adsorption portion can adsorb the battery sheet 200 by vacuum adsorption, so as to drive the battery sheet 200 to move and be placed on the carrier assembly 131. The heating assembly 122 may adopt an infrared heater to heat the battery sheet 200, and the infrared heater acts downward on the battery sheet 200 in the up-down direction of the welding device 100 to heat the battery sheet 200 and the ribbon 300, so that the ribbon 300 is heated and welded to the battery sheet 200. The cutting assembly 123 may adopt a laser cutter, and the ribbon 300 is cut by the laser cutter to obtain a ribbon group adapted to be welded to the battery sheet 200. The sheet detaching assembly adopts the form of a second manipulator to grab and detach the battery sheet 200 after heating and welding. The laser cutting of the cutting assembly 123, the attaching of the battery sheet 200 of the first manipulator, and the detaching of the battery sheet 200 of the second manipulator all need to cooperate with a vision system, so that the position can be adjusted appropriately relative to the position of the battery sheet 200. For example, the arrangement direction of the ribbon 300 on the battery sheet 200 may be adjusted by rotating the battery sheet 200 through the first manipulator. The infrared heater may be heated with or without the vision system.

It may be understood that the structures of the first manipulator and the second manipulator may be arranged to be consistent, that is, the sheet attaching assembly 121 and the sheet detaching assembly may be arranged as the same structure. As an implementation, the sheet attaching assembly 121 and the sheet detaching assembly may further be arranged as the same component, that is, the first work station and the fourth work station may overlap. When the battery sheet 200 needs to be detached, the carrier assembly 131 moves from the third work station to the first work station, and the battery sheet 200 is detached by the first manipulator, thereby simplifying the structure of the welding device 100, improving the structural compactness of the welding device 100, and saving the cost of the welding device 100.

As shown in FIG. 1, as an implementation, the heating assembly 122 further includes a wind power module 1221, and the wind power module 1221 is configured to transfer heat of the heating assembly 122 to the battery sheet 200. The wind power module 1221 may be arranged as a fan. The wind power module 1221 and the heating assembly 122 are integrated, that is, the wind power module 1221 and the heating assembly 122 may be integrated, thereby facilitating the simplification of the structure of the first mechanism 12. The wind power module 1221 is at least partially arranged on an upper side of the heating assembly 122 in the up-down direction of the welding device 100, so that the wind power module 1221 can transfer the heat of the heating assembly 122 to the battery sheet 200 more quickly, so as to improve the welding efficiency of the battery sheet 200 and the ribbon 300, and further improve the working efficiency of the welding device 100. It may be understood that the wind power module 1221 is only used as a preferred solution, and in the actual operation of the welding device 100, the wind power module 1221 may not be arranged to reduce the cost of the welding device 100.

Figure 5:
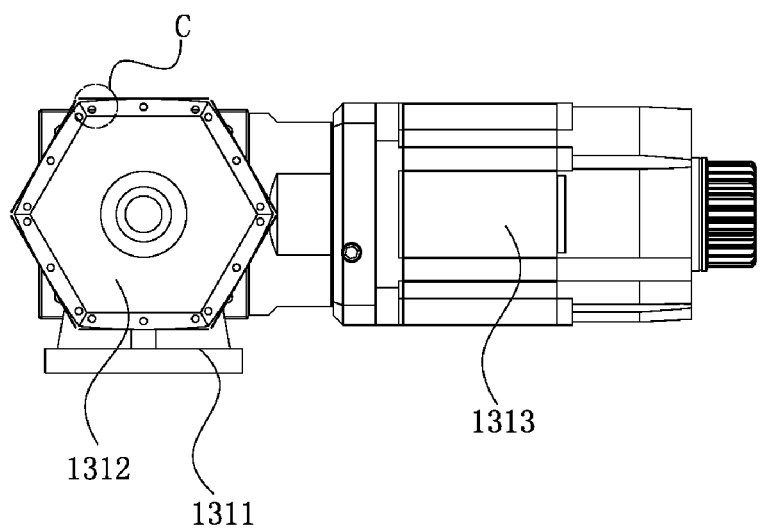
FIG. 5 is a schematic structural side view of a carrier assembly according to the present invention.

As shown in FIG. 1, FIG. 2, and FIG. 5, a ribbon carrier assembly 131 is configured for preprocessing between a battery sheet 200 and a ribbon 300. The carrier assembly 131 includes a carrier seat 1311, a carrier body 1312, and a driving assembly 1313. The carrier seat 1311 is at least partially arranged on the device body 11 and can move relative to the device body 11. The driving assembly 1313 is at least partially arranged on the device body 11, and the carrier seat 1311 and the device body 11 are connected through the driving assembly 1313, so that the driving assembly 1313 drives the carrier seat 1311 to move on the device body 11. The carrier body 1312 is arranged on the carrier seat 1311, and the carrier body 1312 is rotatably connected to the carrier seat 1311. The carrier body 1312 is configured for the battery sheet 200 and the wound ribbon 300 to be placed. Specifically, the driving assembly 1313 is further connected to the carrier body 1312, so that the driving assembly 1313 can control the rotation of the carrier body 1312.

More specifically, the driving assembly 1313 includes a first driving member 1313a and a second driving member 1313b. The first driving member 1313a is configured for the connection between the device body 11 and the carrier seat 1311, thereby controlling the movement of the carrier seat 1311 on the device body 11. The second driving member 1313b is connected to the carrier body 1312, thereby controlling the rotation of the carrier body 1312 relative to the carrier seat 1311. The first driving member 1313a and the second driving member 1313b may be integrated, or the first driving member 1313a and the second driving member 1313b may be arranged as two separate driving components. The first driving member 1313a may be a linear driving component such as a lead screw slider, a linear motor, an air cylinder, and the like, and the second driving member 1313b may be a driving component such as a motor, a synchronous belt, a synchronous belt wheel, and the like for controlling a certain part to rotate around an axis.

Figure 4:
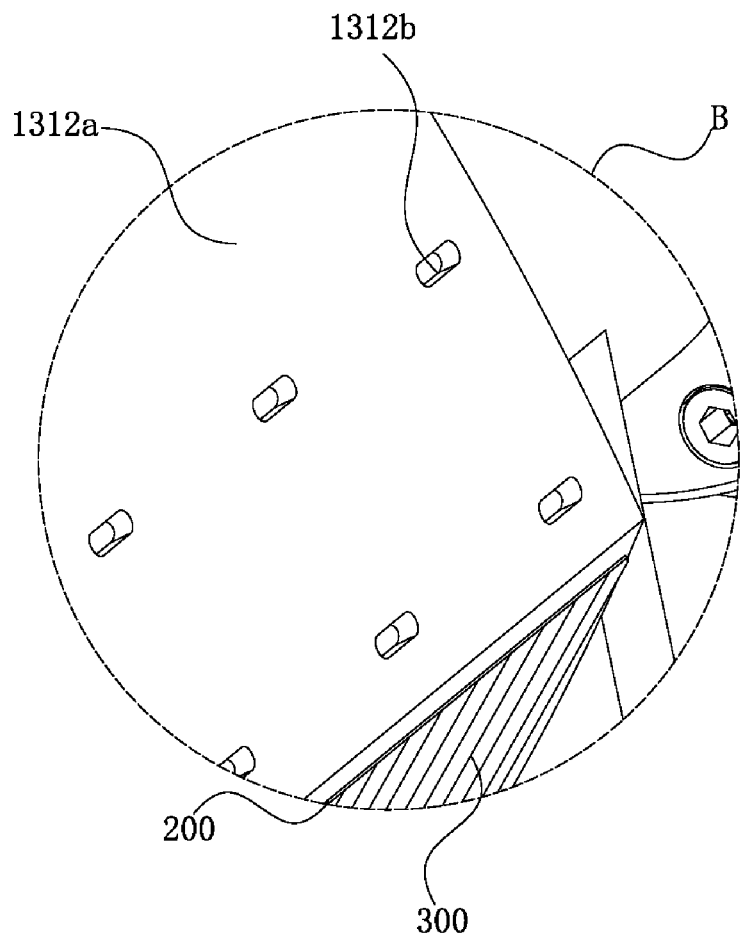
FIG. 4 is a partial enlarged view of a part B in FIG. 2 according to the present invention.
Figure 6:
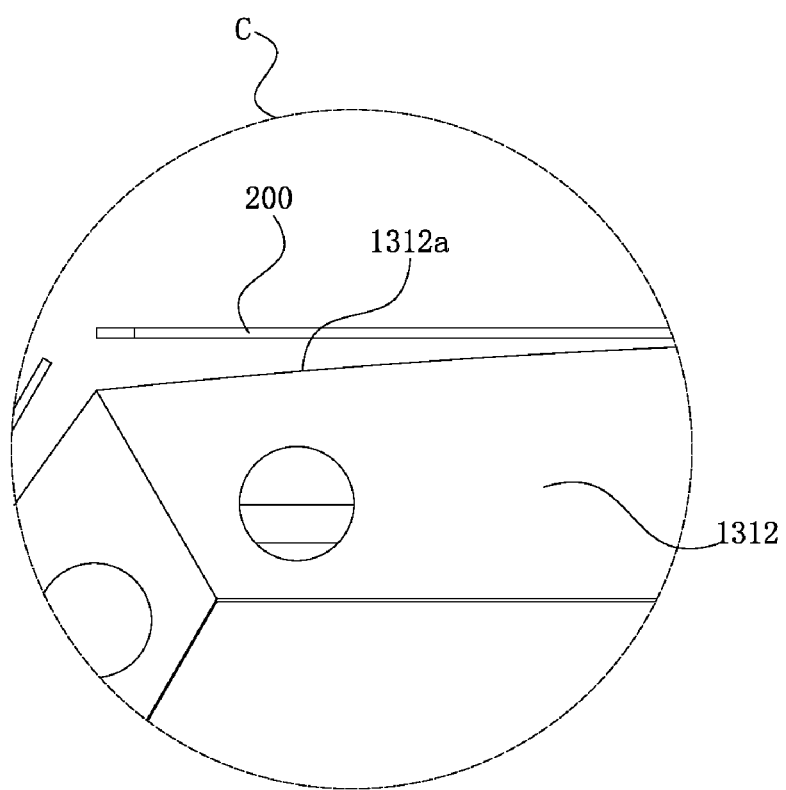
FIG. 6 is a partial enlarged view of a part C in FIG. 5 according to the present invention.

As shown in FIG. 2, FIG. 4, and FIG. 6, in this implementation, at least one operation surface 1312a is arranged on the carrier body 1312. The operation surface 1312a is arranged as a curved surface, and adsorption holes 1312b are arranged on the operation surface 1312a, so that the battery sheet 200 is adsorbed and fixed to the operation surface 1312a by applying a negative pressure to the adsorption holes 1312b, and in this case, the ribbon 300 is wound around the battery sheet 200. Through the above arrangement, the adsorption of the battery sheet 200 and the operation surface 1312a can be more stable through the adsorption holes 1312b, which facilitates the subsequent layout of the ribbon 300 on the battery sheet 200, thereby improving the welding stability between the battery sheet 200 and the ribbon 300 in the subsequent welding process of the ribbon 300 and the battery sheet 200. In addition, the operation surface 1312a is arranged as a curved surface, so that the battery sheet 200 can be slightly deformed, the battery sheet 200 is also correspondingly bent and closely attached to the operation surface 1312a, and the ribbon 300 can be more attached to the surface of the battery sheet 200 when the ribbon 300 is laid on the battery sheet 200. Then dry joints between the battery sheet 200 and the ribbon 300 can be reduced during welding of the ribbon 300 and the battery sheet 200, and the battery sheet 200 is bent on the curved surface to avoid warping or cracking of the battery sheet 200 caused by excessive heating, thereby prolonging the service life of the battery sheet 200. It may be understood that when the carrier assembly 131 is at the first work station, the sheet attaching assembly 121 controls the battery sheet 200 to be placed on the operation surface 1312a, and in this case, the ribbon 300 is wound around the battery sheet 200. When the carrier assembly 131 is at the third work station, the cutting assembly 123 cuts the ribbon 300 along the edge of the operation surface 1312a.

As an implementation, several operation surfaces 1312a may be arranged on the carrier body 1312. That is to say, at least two operation surfaces 1312a, at least three operation surfaces 1312a, at least four operation surfaces 1312a, and the like may be arranged on the carrier body 1312. Two adjacent operation surfaces 1312a are connected to each other, and the position at which the two adjacent operation surfaces 1312a are connected is formed as a straight line, so that the cutting of the ribbon 300 can be performed along the straight line, thereby obtaining a group of short ribbon groups on each of the operation surfaces 1312a. The operation surfaces 1312a may be arranged on a side surface of the carrier body 1312, each operation surface 1312a has the same size, area, and shape, and the operation surfaces 1312a are parallel to the carrier body 1312 and extend in an axial direction of the carrier body 1312. Since the carrier body 1312 and the carrier seat 1311 are rotatably connected, the carrier body 1312 has a rotary shaft. When a plurality of operation surfaces 1312a are arranged, the operation surfaces 1312a are symmetrically distributed about the center of the rotary shaft of the carrier body 1312. Through the above arrangement, a number of battery sheets 200 carried by the carrier body 1312 can be increased, that is, a plurality of battery sheets 200 can be processed by the carrier body 1312 with a plurality of operation surfaces 1312a, thereby improving the working efficiency of the welding device 100.

As an implementation, the carrier body 1312 is plate-shaped, and the operation surface 1312a is arranged on each of front and back sides of the carrier body 1312. When the battery sheet 200 is adsorbed onto the operation surface 1312a, the ribbon 300 extends to two ends of the carrier body 1312 in the form of equidistant threads in the plate-shaped axial direction, so that the surfaces of the battery sheets 200 on the front and back operation surfaces 1312a are both provided with parallel and equidistant ribbons 300. Specifically, the driving assembly 1313 drives the plate-shaped carrier body 1312 to rotate, so that the battery sheets 200 are respectively adsorbed and fixed on the front and back operation surfaces 1312a, thereby winding the ribbon 300 around the surface of the battery sheet 200.

As an implementation, the carrier body 1312 is columnar, several side surfaces are arranged on the carrier body 1312, and the operation surface 1312a is arranged on each of the side surfaces. The operation surfaces 1312a are arranged symmetrically about the axial direction of the carrier body 1312, and each operation surface 1312a is parallel to the axial direction of the carrier body 1312. Two adjacent operation surfaces 1312a are connected to each other. For example, the shape of the carrier body 1312 may be a right triangular prism, a right quadrangular prism, a right pentagonal prism, a right hexagonal prism, and a right n-gonal prism. Certainly, in order for the length of the ribbon 300 on the operation surface 1312a to meet the requirements of the battery sheet 200, the size and shape of the operation surface 1312a of the carrier body 1312 are reasonably selected. Preferably, the carrier body 1312 may be a right hexagonal prism, a right octagonal prism, a right decagonal prism, or a right dodecagonal prism. When the battery sheet 200 is adsorbed onto the operation surface 1312a, the ribbon 300 extends to two ends of the carrier body 1312 in the form of equidistant threads in the axial direction of the carrier body 1312, so that the surfaces of the battery sheet 200 on the operation surface 1312a of the carrier body 1312 are all laid with parallel and equidistant ribbons 300. Specifically, the driving assembly 1313 drives the columnar carrier body 1312 to rotate, so that the battery sheets 200 are respectively adsorbed and fixed to several side surfaces of the carrier body 1312, thereby winding the ribbon 300 around the surface of the battery sheet 200.

Through the above two implementations, when the carrier body 1312 uses the rotation axis as the rotation center, each operation surface 1312a rotates with the carrier body 1312, so that the operation surfaces 1312a are switchable to each other.

It may be understood that the carrier body 1312 may also be arranged as a column, that is, the carrier body 1312 forms a columnar carrier body 1312 in the form of a right dodecagonal prism. Specifically, since the operation surfaces 1312a are arranged as curved surfaces, a columnar structure is formed between the operation surfaces 1312a when the carrier body 1312 is in the form of a right dodecagonal prism, so that the carrier body 1312 is formed into a columnar shape.

It may be understood that by replacing the carrier body 1312, or adjusting the number of wound ribbons 300 on the carrier body 1312, the spacing or number of ribbon groups on the carrier body 1312 can be adjusted according to different process requirements, so that the adjustability and expandability of the welding device 100 can be improved.

As an implementation, when the carrier assembly 131 is at the first work station, that is, when the carrier body 1312 is at the first work station, the battery sheet 200 is placed on the carrier body 1312, and an end of the ribbon 300 is fixedly arranged on the surface of the battery sheet 200. Specifically, the end of the ribbon 300 may be bonded to the surface of the battery sheet 200. More specifically, one end of the ribbon 300 is bonded to the surface of the battery sheet 200, and the other end of the ribbon 300 is also bonded to the surface of the battery sheet 200 after the ribbon 300 is laid on the surface of the battery sheet 200, that is, after the ribbon 300 is wound around the surface of the battery sheet 200. It may be understood that the end of the ribbon 300 may also be arranged on the surface of the battery sheet 200 in other fixing manners, as long as the welding between the battery sheet 200 and the ribbon 300 and the normal operation of the battery sheet 200 are not affected. In this implementation, first, the end of the ribbon 300 is fixed to the surface of the battery sheet 200 by using a special adhesive, and then the ribbons 300 are uniformly arranged on the battery sheet 200 through the fitting of the mechanism such as the carrier assembly 131. The ribbon 300 may be clamped onto the battery sheet 200 and fixed in any form, for example, by a manipulator.

As shown in FIG. 4, as an implementation, the adsorption holes 1312b are uniformly arranged on the operation surface 1312a, thereby improving the adsorption effect of the adsorption holes 1312b on the battery sheet 200. Further, the battery sheet 200 can be closely attached to the operation surface 1312a, which facilitates the welding of the battery sheet 200 and the ribbon 300, and prevents the battery sheet 200 from warping and cracking due to excessive heating. Specifically, the adsorption holes 1312b may be arranged on the operation surface 1312a at equal intervals.

Alternatively, in order to improve the fitting degree between the battery sheet 200 and the operation surface 1312a arranged as the curved surface, more adsorption holes 1312b may be arranged on the left and right sides of the operation surface 1312a in the left-right direction of the welding device 100, so as to prevent left and right ends of the battery sheet 200 from being separated from left and right ends of the operation surface 1312a, and to avoid warping or cracking of the battery sheet 200 caused by excessive heating.

As an implementation, the carrier assembly 131 includes a first state and a second state. When the carrier assembly 131 is in the first state, at least one operation surface 1312a is horizontally arranged. In this application, the horizontal arrangement means that the operation surface 1312a is arranged perpendicular to the up-down direction of the welding device 100. When the carrier assembly 131 is in the second state, the carrier assembly 131 is in a rotating state, to switch between the operation surfaces 1312a. The driving assembly 1313 is configured to control the switching of the carrier assembly 131 between the first state and the second state. Specifically, when the carrier assembly 131 is in the first state, the battery sheet 200 on at least one operation surface 1312*a* is in a state of being operated by the sheet attaching assembly 121, the heating assembly 122, or the sheet detaching assembly. Through the above arrangement, when the carrier assembly 131 is in the first state, the battery sheet 200 on at least one operation surface 1312*a* may be caused to be perpendicular to the up-down direction of the welding device 100, which is convenient for the sheet attaching assembly 121, the heating assembly 122, or the sheet detaching assembly located above the carrier assembly 131 to perform corresponding operations on the battery sheet 200. In addition, through switching between the operation surfaces 1312*a*, the first mechanism 12 may be caused to process a plurality of battery sheets 200, thereby improving the working efficiency of the welding device 100.

In this implementation, the driving assembly 1313 first drives the carrier assembly 131 to the first work station, the sheet attaching assembly 121 absorbs and places the battery sheet 200 on the operation surface 1312*a*, and the ribbon 300 is wound around the battery sheet 200. The driving assembly 1313 drives the carrier assembly 131 to the second work station, and the heating assembly 122 acts downward on the battery sheet 200 to heat the battery sheet 200, thereby completing the step of welding the ribbon 300. The driving assembly 1313 drives the carrier assembly 131 to the third work station, and the cutting assembly 123 cuts the ribbon 300 at the joint of two adjacent operation surfaces 1312*a*. The driving assembly 1313 drives the carrier assembly 131 to the fourth work station, and the sheet detaching assembly removes the battery sheet 200 welded by the ribbon 300 from the operation surface 1312*a*, thereby completing the welding between the ribbon 300 and the battery sheet 200 on the operation surface 1312*a*. The driving assembly 1313 drives the carrier assembly 131 back to the first work station, and the above operations are repeatedly performed. At the first work station, the second work station, the third work station, and the fourth work station, the driving assembly 1313 controls the rotation of the carrier assembly 131, so that the first mechanism 12 performs corresponding operations on the battery sheet 200 and the ribbon 300 on each operation surface 1312*a*, so as to improve the working efficiency of the welding device 100.

Figure 7:
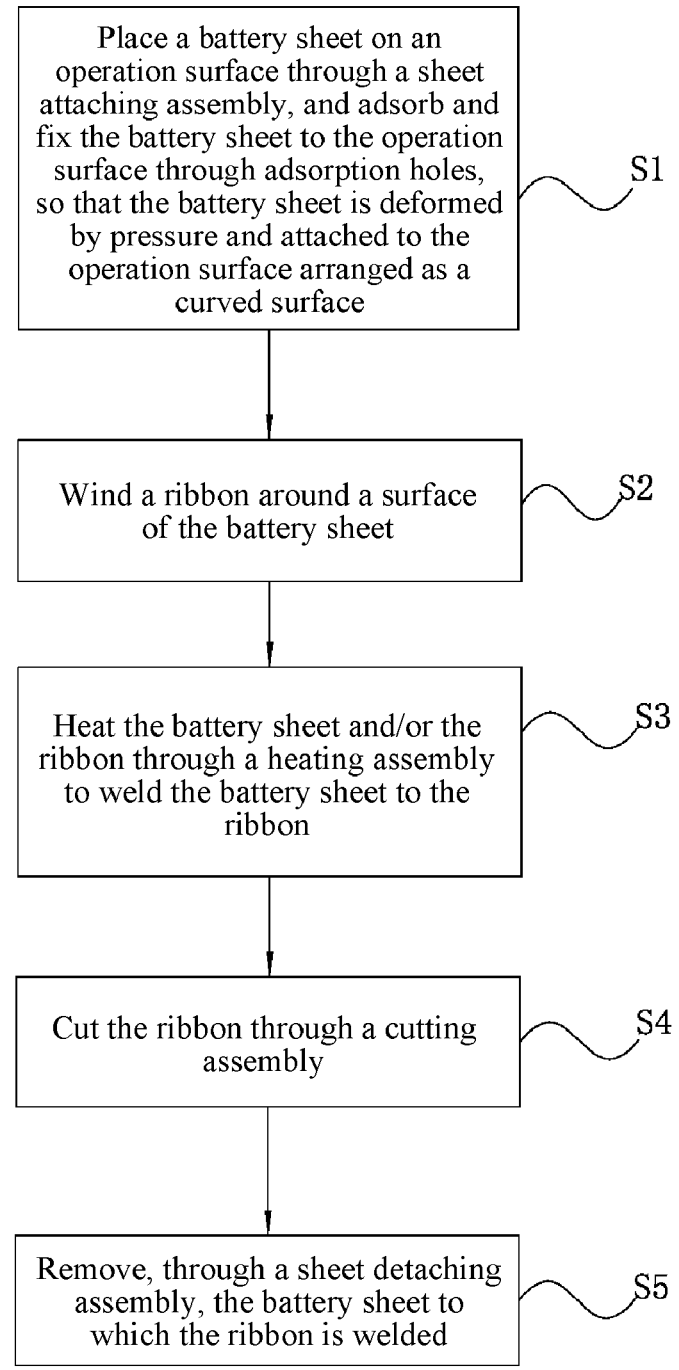
FIG. 7 is a schematic flowchart of a welding method according to the present invention.

As shown in FIG. 7, a welding method includes the following steps.

S1: Place a battery sheet 200 on an operation surface 1312*a* through a sheet attaching assembly 121, and adsorb and fix the battery sheet 200 to the operation surface 1312*a* through the adsorption holes 1312*b*, so that the battery sheet 200 is deformed by pressure and attached to the operation surface 1312*a* arranged as a curved surface.

S2: Wind a ribbon 300 around a surface of the battery sheet 200.

S3: Heat the battery sheet 200 and/or the ribbon 300 through a heating assembly 122 to weld the battery sheet 200 to the ribbon 300.

S4: Cut the ribbon 300 through a cutting assembly 123.

S5: Remove, through a sheet detaching assembly, the battery sheet 200 to which the ribbon 300 is welded.

Specifically, in step S1, the carrier assembly 131 is at a first work station, and the carrier assembly 131 is caused to be in a first state. The sheet attaching assembly 121 places the battery sheet 200 on the operation surface 1312*a* through adsorption, and pumps the adsorption holes 1312*b* by using a device such as an air pump, so as to adsorb and fix the battery sheet 200 by applying a negative pressure to the adsorption holes 1312*b*. Second, the driving assembly 1313 controls the rotation of the carrier assembly 131, so that the battery sheet 200 is also placed on the other operation surface 1312*a* adjacent to the above operation surface 1312*a*, and the battery sheet 200 is adsorbed and fixed to the other operation surface 1312*a*. The above steps are repeated so that each operation surface 1312*a* has the battery sheet 200 adsorbed thereon. Due to the adsorption effect of the adsorption holes 1312*b* on the battery sheet 200, the battery sheet 200 is closely attached to the operation surface 1312*a* arranged as a curved surface.

In step S2, the ribbon 300 is provided for the carrier assembly 131 through an existing ribbon feeding apparatus, so that the ribbon 300 is wound around the carrier assembly 131 by the rotation of the carrier assembly 131. The ribbon feeding apparatus may be a winch, and the like. In this case, one end of the ribbon 300 is fixed to the surface of the battery sheet 200, and the other end of the ribbon 300 is also fixed to the surface of the battery sheet 200 after the ribbon 300 is wound around the battery sheet 200.

In step S3, the carrier assembly 131 is moved from the first work station to a second work station through the driving assembly 1313, and the carrier assembly 131 is caused to be in the first state. The heating assembly 122 heats the battery sheet 200, and welds the ribbon 300 on the operation surface 1312*a* to the battery sheet 200. It is to be noted that the surface of the ribbon 300 has a tin layer structure, and the ribbon 300 may be welded to the battery sheet 200 after the tin layer structure is heated and melted. The driving assembly 1313 controls the rotation of the carrier assembly 131, so that the battery sheet 200 and the ribbon 300 on the other operation surface 1312*a* adjacent to the above operation surface 1312*a* are heated by the heating assembly 122. The above steps are repeated, so that the battery sheet 200 and the ribbon 300 on each operation surface 1312*a* are welded.

In step S4, the carrier assembly 131 is moved from the second work station to a third work station through the driving assembly 1313. The driving assembly 1313 rotates the carrier assembly 131, so that the joint of two adjacent operation surfaces 1312*a* of the carrier assembly 131 is aligned with the cutting assembly 123, and the cutting assembly 123 cuts the ribbon 300 at the joint of two adjacent operation surfaces 1312*a*, thereby realizing the cutting of the ribbon 300 by the cutting assembly 123. The adsorption holes 1312*b* release the adsorption to the battery sheet 200 after the ribbon 300 is wound around the surface of the battery sheet 200, and the adsorption holes 1312*b* adsorb the battery sheet 200 before the cutting assembly 123 cuts the ribbon 300. Through the above arrangement, the battery sheet 200 is adsorbed by a negative pressure and attached to the operation surface 1312*a* arranged as the curved surface, and after the ribbon 300 is wound around the battery sheet 200, the adsorption holes 1312*b* release the adsorption of the battery sheet 200, and the battery sheet 200 tends to return to a flat state. In this way, the battery sheet 200 and the ribbon 300 are attached more closely, and the problem of dry joints does not occur.

In step S5, the carrier assembly 131 is moved from the third work station to a fourth work station through the driving assembly 1313, and the carrier assembly 131 is caused to be in the first state. The sheet detaching assembly adsorbs the battery sheet 200 on the operation surface 1312*a* through adsorption. In this case, the adsorption of the adsorption holes 1312*b* to the battery sheet 200 is released by turning off a device such as the air pump, so that the sheet detaching assembly can remove the battery sheet 200 from the operation surface 1312*a*. Second, the driving assembly 1313 controls the rotation of the carrier assembly 131, so that the sheet detaching assembly removes the battery sheet 200 on the other operation surface 1312a adjacent to the above operation surface 1312a. The above steps are repeated, so that the battery sheet 200 on each operation surface 1312a is removed by the sheet detaching assembly.

It should be understood that a person of ordinary skill in the art may make improvements or transformations according to the above description, and all of the improvements and transformations shall fall within the protection scope of the attached claims of the present invention.

What is claimed is:

1. A ribbon carrier assembly, configured for preprocessing between a battery sheet and a ribbon and comprising:
   a carrier seat;
   a carrier body, rotatably connected to the carrier seat; and
   a driving assembly, connected to the carrier body and configured to control the rotation of the carrier body, wherein
   at least one operation surface is arranged on the carrier body, the at least one operation surface is arranged as a curved surface, adsorption holes are arranged on the at least one operation surface, the battery sheet is adsorbed and fixed to the at least one operation surface by applying a negative pressure to the adsorption holes, and the ribbon is wound around the battery sheet; wherein the carrier body is columnar, several side surfaces are arranged on the carrier body, and the at least one operation surface is arranged on each of the side surfaces.

2. The ribbon carrier assembly according to claim 1, wherein operation surfaces are on the carrier body, and wherein two adjacent operation surfaces are connected to each other.

3. The ribbon carrier assembly according to claim 1, wherein the adsorption holes are uniformly arranged on the at least one operation surface.

4. The ribbon carrier assembly according to claim 1, comprising a first state and a second state, wherein when the ribbon carrier assembly is in the first state, at least one operation surface is horizontally arranged; and when the ribbon carrier assembly is in the second state, the ribbon carrier assembly is in a rotating state, to switch between the operation surfaces.

5. A welding device, applicable to the ribbon carrier assembly according to claim 1 and comprising:
   a first mechanism, comprising a sheet attaching assembly, a heating assembly, a cutting assembly, and a sheet detaching assembly; and
   a second mechanism, comprising at least one ribbon carrier assembly, wherein the ribbon carrier assembly has a freedom of movement,
   the ribbon carrier assembly moves among the sheet attaching assembly, the heating assembly, the cutting assembly, and the sheet detaching assembly to form a first work station, a second work station, a third work station, and a fourth work station, when the ribbon carrier assembly is at the first work station, the sheet attaching assembly places the battery sheet on the operation surface, and the ribbon is wound around the battery sheet; when the ribbon carrier assembly is at the second work station, the heating assembly heats the battery sheet to weld the battery sheet to the ribbon; when the ribbon carrier assembly is at the third work station, the cutting assembly cuts the ribbon along an edge of the operation surface; and when the ribbon carrier assembly is at the fourth work station, the sheet detaching assembly removes the battery sheet to which the ribbon is welded.

6. A welding method, applicable to the welding device according to claim 5 and comprising:
   placing the battery sheet on the operation surface through the sheet attaching assembly, and adsorbing and fixing the battery sheet to the operation surface through the adsorption holes, so that the battery sheet is deformed by pressure and attached to the operation surface arranged as a curved surface;
   winding the ribbon around a surface of the battery sheet;
   heating the battery sheet and the ribbon through the heating assembly to weld the battery sheet to the ribbon;
   cutting the ribbon through the cutting assembly; and
   removing the battery sheet to which the ribbon is welded through the sheet detaching assembly.

7. The welding method according to claim 6, wherein an end of the ribbon is fixedly arranged on the surface of the battery sheet.

8. The welding method according to claim 6, wherein the adsorption holes release the adsorption to the battery sheet after the ribbon is wound around the surface of the battery sheet, and the adsorption holes adsorb the battery sheet before the cutting assembly cuts the ribbon.

* * * * *